United States Patent Office 3,302,376
Patented Feb. 7, 1967

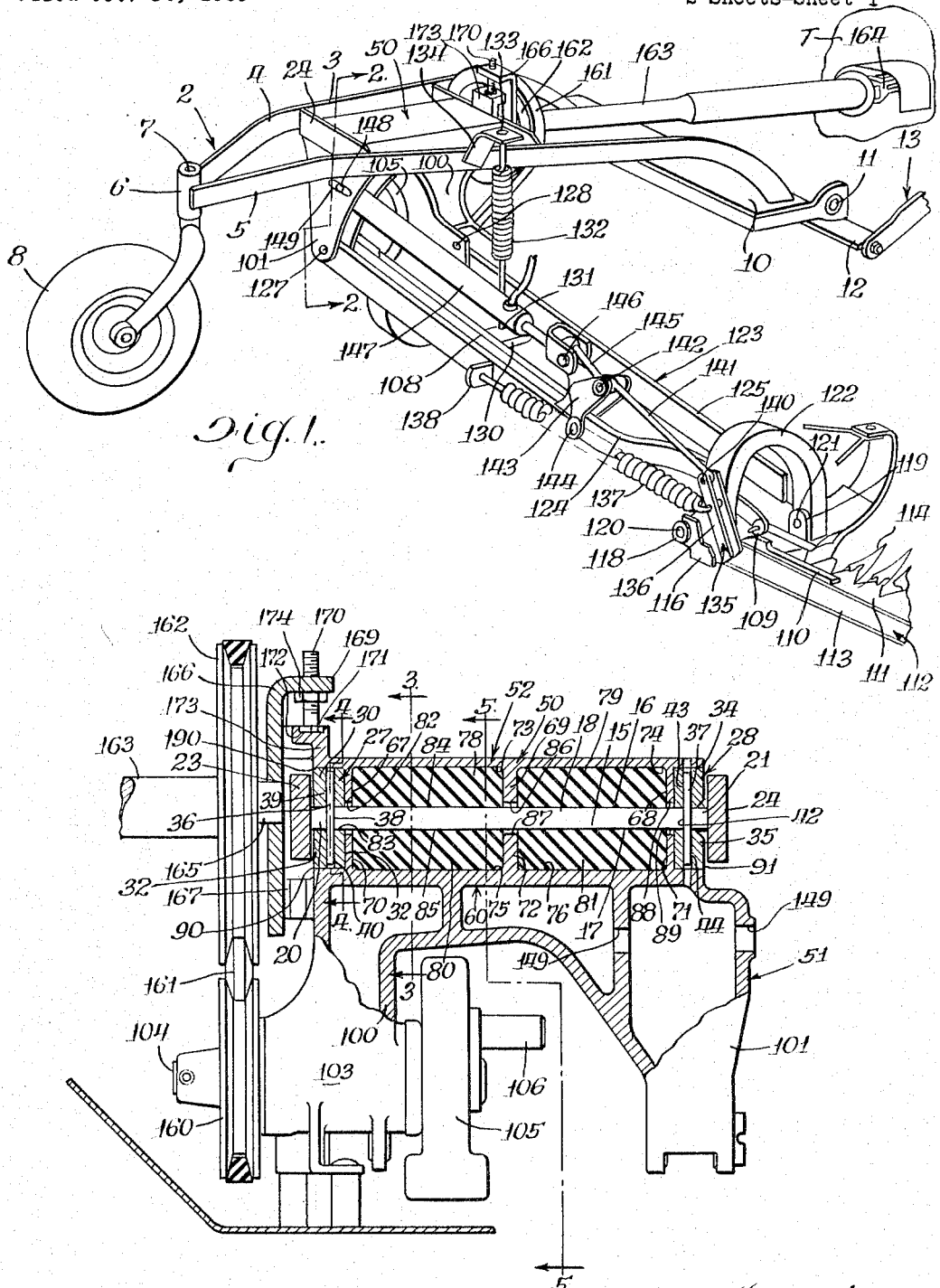

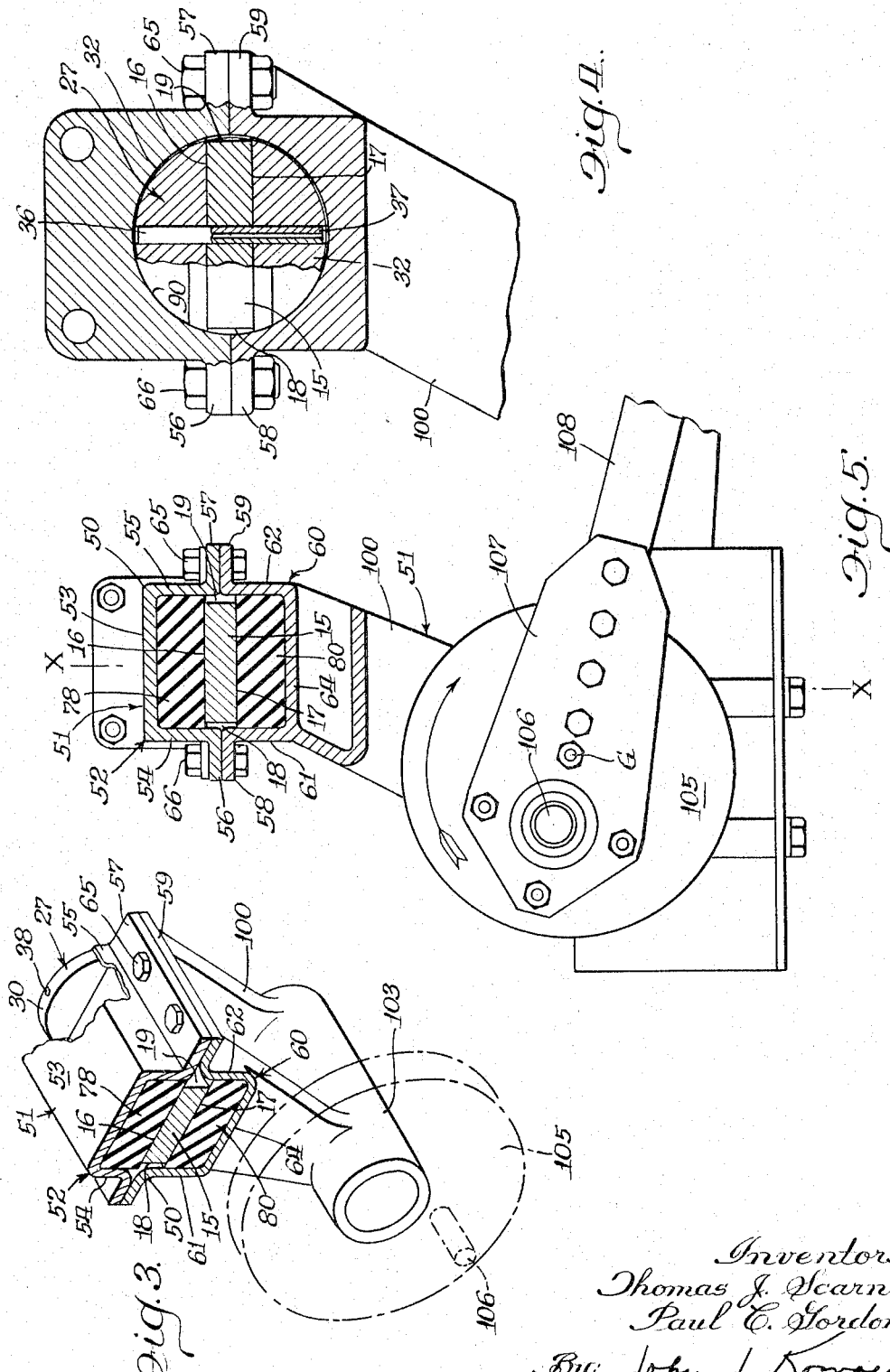

3,302,376
VIBRATION CONTROLLED MOWER MOUNTING
Thomas J. Scarnato, Park Ridge, and Paul C. Gordon, Hinsdale, Ill., assignors to International Harvester Company, Chicago, Ill., a corporation of Delaware
Filed Oct. 14, 1963, Ser. No. 315,784
7 Claims. (Cl. 56—25)

This invention relates to mowers of the reciprocating type and more specifically to a novel mounting therefor which absorbs the normal vibrations incident to such mower operation and also enhances the cutting action of the mower and furthermore is an improvement on the structure shown in U.S. Patent No. 3,092,947, issued June 11, 1963.

As stated in the foregoing patent, pitman-type mowers which are operated by a crank drive have been found to be extremely objectionable not only from a point of developing excessive stresses on the parts but also because they were limited in the speed at which they could be driven and also because they vibrated the tractor with such severity they increased driver fatigue. The resilient pendulum-supported mower, as described in the foregoing patent, has been found to solve this problem.

In further experimentation with the unit shown in the patent, we have discovered that for optimum operation, the elastomer material between the mower supporting pendulum and the supporting structure should be approximately of 20 durometer. This yieldability of the rubber material which somewhat approaches sponge-rubber, does not possess the necessary support characteristics, and therefore it has been necessary to develop a novel mounting structure which would admit of the use of this very soft material to obtain the cushioning effect without so loading the material that its usefulness is no longer served and inadequate support for the parts is obtained.

It is a general object of the invention to provide a novel mounting for the pendulum-support for a mower from a supporting structure utilizing a soft rubber or elastomer material connection therebetween in order to control the pendulation or oscillation of the pendulum incident to the unbalancing forces imposed thereon by the crank structure.

In furtherance of the foregoing object, it is contemplated to provide a mower mounting which incorporates a substantially horizontal, generally rectangular, bar structure on the supporting part, the bar structure being received between upper and lower pads of yieldable material, said pads being encased within a housing which admits the bar portion centrally therein, the yieldable material being subjected to alternating compressive loading between opposing surfaces on the bar and on the housing and the bar being prevented from sagging the material by providing annular pivot portions at spaced intervals on the bar which are substantially concentric with the axis of pendulation of the pendulum member, and which engage, only when the entire mower is supported thereby, with complementary portions of the housing.

The load sustaining characteristics of the elastomer material which may be between 15 and 25 durometer and may be of substantially pure gum rubber is so dimensioned that it will sustain the pendulum member and the drive structure without contact between the cylindrical portions of the supporting structure and the housing so that the pendulum structure as well as the mower coupling on the crank and associated drive mechanism and a portion of the lifting mechanism, which is counterbalanced by a lifting spring between the coupling arm and the supporting framework, will be sustained and that upon the mower being lifted off the ground the excess weight of the mower will then be supported through the cylindrical sections of the supporting structure engaging the housing.

These and other objects and advantages inherent in and encompassed by the invention will become more readily apparent from the specification and the drawings, wherein:

FIGURE 1 is a perspective view of our novel mower incorporating the invention:

FIGURE 2 is an enlarged, fragmentary longitudinal sectional view taken substantially on the line 2—2 of FIGURE 1;

FIGURE 3 is a fragmentary perspective view on an enlarged scale partly in section, the section being taken substantially on the line 3—3 of FIGURE 2;

FIGURE 4 is an enlarged sectional view taken substantially on the line 4—4 of FIGURE 2; and FIGURE 5 is an enlarged sectional view taken substantially on the line 5—5 of FIGURE 2.

Describing the invention in detail, the mower generally designated 2 may be of any pitman-type and is herein shown as a semi-mounted trailing type which includes a supporting structure which is in the form of a frame 3 comprising a pair of rearwardly converging side members 4 and 5 which merge into a ferrule or sleeve 6 in which is mounted a vertical spindle 7 of a caster wheel assembly 8 disposed at the trailing end of the mower. The forward ends of the frame members 4 and 5 are integrated with a transverse front beam member 10 which is suitably connected by bolts 11 to drawbar 12 of a conventional hitch structure generally designated 13, which is suitably mounted on an associated tractor as well known by those skilled in the art.

The frame members 4 and 5 support an intermediate longitudinal fore-and-aft extending support bar or member 15, said member 15 being substantially rectangular in cross section and having generally horizontal top and bottom surfaces 16 and 17 and substantially vertical side edges 18 and 19. The bar or support member structure 15 is integrally united at its front and rear ends 20 and 21 with transverse front and rear struts 23 and 24 which are integrally connected with the side beam members 4 and 5 intermediate their ends and define a substantially A-frame structure therewith. Thus, it will be seen that the supporting structure includes the member 15 and the cross members 23 and 24 as well as the frame 3 which may be designated the main frame. The front and rear ends 20 and 21 of the support bar carry front and rear pivot cylinders or bearing assemblies 27 and 28 which are of similar construction and oriented about the longitudinal axis of the bar 15. Member 27 includes upper and lower halves 30 and 32 and member 28 has upper and lower halves 34 and 35. The halves 30 and 32 are secured to the associated end portion 20 of the bar 15 by means of a vertical spring pin 36 and the bearing halves 34, 35 are secured to the rear end portion 24 of the bar 25 by vertical spring pin 37. These spring pins are well known in the art and are of spring steel, C-shape in cross section and of slightly larger diameter than the openings 38 in bar 15 and 39 and 40 in bearing 27 which admit the pin 36 and similarly of the openings 42 in bar 15 and 43 and 44 in the rear retainer bearing 28. It will be appreciated that the pins 36 and 37, driven into the respective apertures and being C-shaped in cross section and being of spring steel, expand and securely hold the parts in assembly.

The rectangular bar 15 is encased within a housing structure 50 which is formed at the upper end of the pendulum, or pendulum member or supported structure, generally designated 51. The housing 50 is substantially square in cross section as best seen in FIGURES 3 through 5 and comprises an upper cover portion 52 which is of inverted U-section having a top wall 53, a pair of laterally spaced dependent flange walls 54 and 55 which at their lower ends are provided with out-turned flanges 56, 57 which seat upon complementary flanges 58 and 59 of the lower housing portion 60 which is of U-shape in cross section and which is provided with upstanding sidewalls 61, 62 which respectively are in vertical alignment with the wall portions 54 and 55. Bottom portion 60 has a bottom wall 64 which is substantially parallel with the wall 53 and disposed substantially horizontally.

The opposed housing portions 52, 60 are interconnected at their flanges 57, 59 and 56, 58 by a series of nut and bolt assemblies 65, 66. The upper portion 52 is provided with end walls 67, 68 on intermediate wall 69; and the bottom portion 60 is provided with end walls 70, 71 and an intermediate wall 72. The walls 67, 70 are in vertical alignment at the forward end of the assembly; walls 68, 71 are in vertical alignment at the rear end of the assembly and walls 69, 72 are in vertical alignment intermediate the ends of the assembly or medially thereof. These walls 67 through 71, together with the associated respective walls of the respective upper and lower portions, form pockets 73, 74 in the upper portion and pockets 75, 76 in the lower portion which are generally of rectangular configuration and complementally admit pads 78, 79, 80 and 81 of elastomer material such as pure gum rubber or the like which has a durometer of 20 plus or minus 5. Therefore, the range is between 15 and 25 durometer. It will be noted that the opposing walls 67, 70 have their inner edges 82, 83 spaced from the top and bottom sides 16 and 17 of the bar 15 and similarly the walls 69, 72 have their ends 86, 87 vertically spaced from the top and bottom sides 16 and 17 of the bar 15 and the walls 68, 71 have their inner ends 88, 89 vertically spaced from the top and bottom sides 16 and 17 of the support bar 15. Thus, it will be realized that the pads 78 through 81 serve as a support for the supported assembly 51 from the supporting structure 15. The housing 50 has opposite ends of its upper and lower portions 52, 60 formed with semi-annular cavities to form coaxial bores 90 and 91 which admit the respective bearings 27 and 28 therein. However, the bores 90 and 91 are approximately 1/30" larger in diameter than the diameter of the respective bearing pivot assemblies 27, 28. Thus, under normal circumstances, the bearing assemblies 27, 28 are out of contact with the housing and the weight of the pendulum structure 51 is entirely supported by the pads of material which applies a compressive load on the pads inasmuch as the center of gravity indicated G of the lower portion of the pendulum structure, as hereinafter set forth, is offset laterally with respect to the vertical plane indicated X—X in FIGURE 5. The effect of this disposition of the masses has been fully explained in the foregoing Patent No. 3,092,947. However, in order to provide the utmost freedom of movement of the pendulum structure 51 while at the same time controlling the vibration, it has been found that by providing the extremely flexible elastomer material an efficient cushioning effect is obtained while the vibrations are controlled without transmitting the same to the supporting structure at such magnitude that would be detrimental to the mower assembly. The elastomer pads have sufficient capacity to support not only the pendulum structure 51 which includes the aforementioned housing but also the dependent arm structures 100 and 101 which are angled laterally leftwardly as seen in FIGURES 3 and 5, the lower end of the arm structure 100 providing a fore-and-aft extending bearing mounting 103 which mounts a shaft 104, the rear end of which is connected to a counterweighted crank wheel 105 which has a throw 106 connected to the inner or driven end 107 of a pitman 108 which extends diagonally downwardly in the operating position of the mower and at its lower end is provided with a ball coupling 109 to the drive head 110 of a sickle 111 of the reciprocating mower 112 which includes a mower bar 113 provided with guards 114 or the like which cooperate with the cutting sections of sickle 111 for severing the material entered therebetween as well known to those skilled in the art. It will be seen that the inner end of the mower 112 is provided with an inner shoe 116 which has a pair of upstanding ears 118 and 119 which are pivotally connected by pins 120 and 121 to the legs of a bale 122 which forms the outer end of the coupling structure 123 which includes a pair of laterally fore-and-aft spaced beams 124 and 125, said beams 124 and 125 being pivoted at their ends remote from the mower on coaxial pins 127 and 128 to the lower ends of arm structures 101 and 100. It will be noted that the members 124 and 125 are interconnected immediate their ends by a cross-brace 130 which serves as an anchor for the lower end 131 of a balance spring 132, the upper end of the balance spring connected as at 133 to an anchor 134 suitably secured to the main frame beam member 5. Thus, the balance spring 132 tends to partially support the framework 124, 125 and since it is vertically arranged its effect on the oscillation and motion of the coupling framework 123 of the mower, as the sickle 111 is reciprocated, is minimized. The mower 112 is provided with an operating linkage 135 which includes an upstanding arm structure assembly 136 which has its lower end connected to the inner shoe structure 116 and intermediate its ends is connected to one end of a tension spring 137, the tension spring having its other end connected to a lug 138 which is secured to the beam member 124. The action of the spring 137 counterbalances the weight of the mower 112 about the axis of the pins 120 and 121 to prevent drooping of the outer end of the mower as well known to those skilled in the art. The upper end of the arm 136 is connected at 140 to a rod 141 which is connected at its other end at 142 to the upper end of a supporting swinging lever 143. Lever assembly 143 is pivoted as at 144 to the member 124 and in addition to supporting the link 141 to provide a pivot at 142 for one end of the rod or link 145 which has its other end pivoted as at 146 to one end of the hydraulic ram 147. The ram is of a piston cylinder type and its cylinder portion is provided with an anchor pin 148 which is received within elongated slots 149 in the arm 101. The purpose of the elongation of the slots 149 is to allow the mower to float freely when the cylinder assembly 147 is exhausted. The arrangement of the cylinder and operating linkage 135 is typical and arranged as to initially lift the mower bar 113 by rotating the entire mower 112 about the pins 120 and 121 then upon abutment of the swinging lever link 143 with the member 124, the entire mower assembly and coupling arm structure is lifted upwardly about pivots 127, 128. It will be realized that the excessive weight of the entire mower structure in the lifted position of the mower would so deform and compress the rubber pads that they would become damaged. It is for this reason that the bearing assemblies 27 and 28 are provided so that before overcompression of the pads, the bearings 27, 28 will engage the respective bearing holder portions 90, 91 in the housing of the supporting structure so that the load is carried on the rigid metallic bearings and not upon the pads.

The drive for the mower is obtained through a pulley 160 mounted on the shaft 104 from the belt 161 which is driven from the pulley 162 suitably connected through shafting 163 which may include various flexible joints or universal connections to the power take-off 164 of an associated tractor T, fragmentarily shown. The upper pulley 162 is carried on a shaft and bearing assembly 165 which is mounted on a mounting plate 166, said mounting plate having slidable connections at its lateral edges as at 167 with corresponding tongue and groove connections at opposite sides of the arm portion 100 and having an upper horizontally extending flange 169 through which is admitted shank 170 of the adjusting bolt which has a head portion 171 under the flange 169 within a complementary pocket 172 in an extension 173 on the top of the housing 50, said shank portion having a nut 174 threaded thereon, the nut being underposed with respect to the flange 169 and being operative upon threading and unthreading with respect to the shank 170 to adjust the position of the mounting plate assembly and thus to tighten and loosen the belt 161. A lock nut 180 is threaded on shank 170 to secure the bolt.

What is claimed is:

1. The combination of a frame structure, a laterally extending reciprocating mower assembly having a sickle, coupling structure coupled at one end to the mower assembly, a pendulum member coupled to the other end of said coupling structure, driving means supported from said pendulum member and coupled to said sickle, and means mounting said pendulum member from said frame structure, said means comprising soft elastomeric material of a character sufficient to dampen the principal operating vibrations of the mower assembly and serving as the normal means for floatingly supporting said mower assembly and pendulum member from said frame structure, said means further comprising overload bearing means supporting said pendulum member from said frame structure when said elastomeric material is overloaded.

2. The invention according to claim 1 and said means including a housing on said pendulum member, a non-round element connected to the frame structure and extending through the housing, said element having top and bottom surfaces and the housing having top and bottom surfaces, respectively opposing the top and bottom surfaces of said element, and said material interposed between opposing top and bottom surfaces.

3. In a mower mounting, a support member, a pendular supported member, one member having an elongated bar of rectangular cross-section having top and bottom sides, and the other member having a congruent housing telescoped over the bar, generally flat pads of elastomer material of about 20 durometer interposed between the top and bottom sides of the bar and opposing sides of the housing and providing a generally horizontal axis of pendulation for the pendular member, said supported member having a lower portion with a center of gravity laterally offset from the vertical plane of said axis, a pair of complementary bearing portions secured to said top and bottom sides of the bar and providing an annular periphery substantially concentric with said axis, and said housing having an annular bearing surface about said periphery and of slightly larger diameter than said periphery.

4. The invention according to claim 3 and said bearing portions and said bar having openings therein in diametric alignment, and resilient pins extending through said openings.

5. The invention according to claim 1 and said elastomeric material having a durometer rating below 50.

6. The invention according to claim 1 and said pendulum member swingable about a generally horizontal axis transverse to the reciprocation of the sickle.

7. The invention according to claim 6 and said drive means having an operational axis offset from said horizontal axis in a direction away from the sickle, and said overload bearing means being concentric with said horizontal axis.

References Cited by the Examiner
UNITED STATES PATENTS

| | | | |
|---|---|---|---|
| 2,311,095 | 2/1943 | Simpson et al. | 56—25 |
| 2,495,986 | 1/1950 | Schroeppel | 56—25 |
| 3,092,947 | 6/1963 | Scarnato et al. | 56—25 |

ABRAHAM G. STONE, *Primary Examiner.*

RUSSELL R. KINSEY, *Examiner.*